United States Patent [19]

Dorenbosch

[11] Patent Number: 6,081,202
[45] Date of Patent: Jun. 27, 2000

[54] METHOD AND APPARATUS FOR SCHEDULING A MESSAGE FOR A FIRST MESSAGING SYSTEM AND INFORMING A SUBSCRIBER UNIT ABOUT THE MESSAGE THROUGH A SECOND MESSAGING SYSTEM

[75] Inventor: Jheroen Pieter Dorenbosch, Paradise, Tex.

[73] Assignee: Motorola, Inc., Schaumburg, Ill.

[21] Appl. No.: 08/992,161

[22] Filed: Dec. 17, 1997

[51] Int. Cl.[7] ...................................................... G08B 5/22
[52] U.S. Cl. ................... 340/825.44; 370/348; 455/31.1
[58] Field of Search ......................... 340/825.44, 825.47, 340/825.52, 825.51, 825.48, 825.5, 994, 998; 375/267, 347, 57, 58; 455/186.1, 31.3, 456, 457, 38.1, 33.2; 370/336, 348, 349, 473, 509, 337, 345, 442, 443

[56] References Cited

U.S. PATENT DOCUMENTS 5,175,758  12/1992  Levanto et al. ........................... 379/57
5,392,452  2/1995  Davis ................................. 340/825.44
5,450,071  9/1995  DeLuca et al. ..................... 340/825.44
5,555,446  9/1996  Jansinski ............................ 340/825.44

*Primary Examiner*—Michael Horabik
*Assistant Examiner*—Jean B. Jeanglaude
*Attorney, Agent, or Firm*—R. Louis Breeden

[57] ABSTRACT

A first messaging system (112, 116) schedules (502) a first store-and-forward message (406, 408) for transmission to a subscriber unit (122) on a first channel (410) and enters (504) a second store-and-forward message (404) into a second messaging system (113, 116), the second message intended for the subscriber unit and including a scheduling instruction for receiving the first message. The second messaging system communicates the second message to the subscriber unit on a second channel (412), and the subscriber unit tunes (620) to the first channel, in accordance with the scheduling instruction, after receiving the second message. The first messaging system then transmits (506) the first message on the first channel as scheduled, and the subscriber unit receives the first message on the first channel.

18 Claims, 5 Drawing Sheets

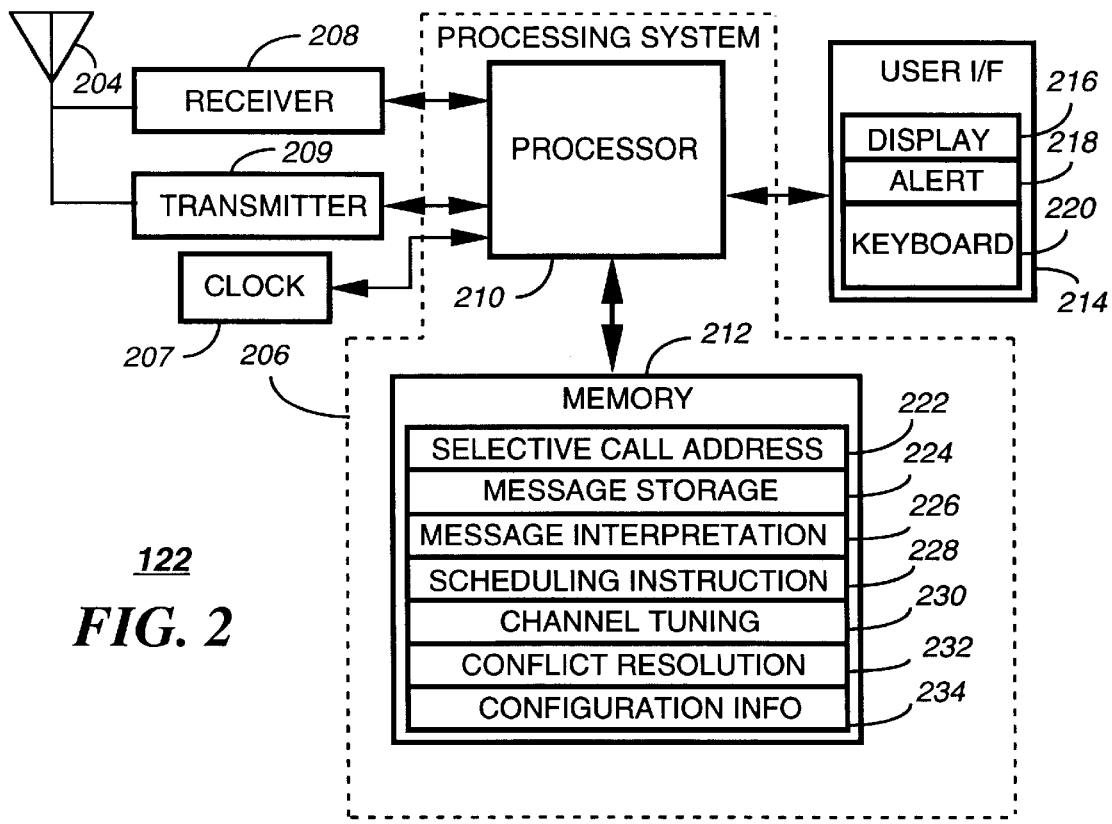

FIG. 2

502
FIRST MESSAGING SYSTEM CONTROLLER SCHEDULES A FIRST STORE-AND-FORWARD MESSAGE FOR TRANSMISSION ON A FIRST CHANNEL, THE FIRST MESSAGE INTENDED FOR A SUBSCRIBER UNIT THAT OPERATES IN A SECOND MESSAGING SYSTEM ON A SECOND CHANNEL.

504
FIRST CONTROLLER THEN ENTERS A SECOND STORE-AND-FORWARD MESSAGE INTO THE SECOND MESSAGING SYSTEM, PREFERABLY USING A STANDARD MESSAGE ENTRY PORT OF THE SECOND MESSAGING SYSTEM AND A STANDARD MESSAGE ENTRY PROTOCOL, AS ALSO USED BY INDIVIDUAL MESSAGE ORIGINATORS. THE SECOND MESSAGE IS ADDRESSED TO THE SUBSCRIBER UNIT AND CONTAINS A SCHEDULING INSTRUCTION, TRANSPARENT TO THE SECOND MESSAGING SYSTEM, FOR INSTRUCTING THE SUBSCRIBER UNIT TO RECEIVE THE FIRST MESSAGE ON THE FIRST CHANNEL.

506
FIRST CONTROLLER TRANSMITS THE FIRST MESSAGE ON THE FIRST CHANNEL, AS SCHEDULED, REPEATING THE FIRST MESSAGE AT A FIRST INTERVAL THAT IS ORTHOGONAL TO A SECOND INTERVAL UTILIZED BY THE SECOND MESSAGING SYSTEM FOR SENDING MESSAGES TO THE SUBSCRIBER UNIT.

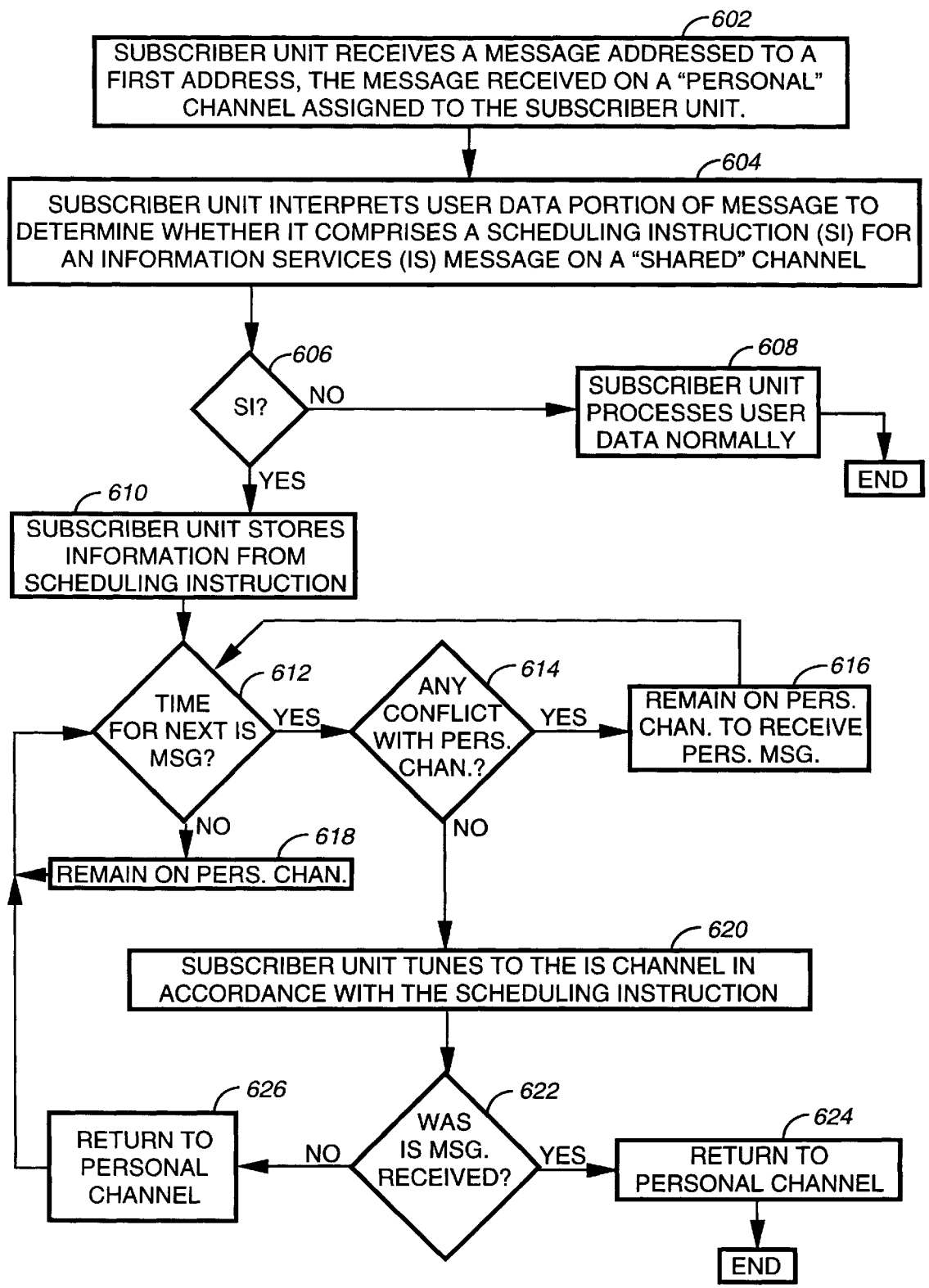

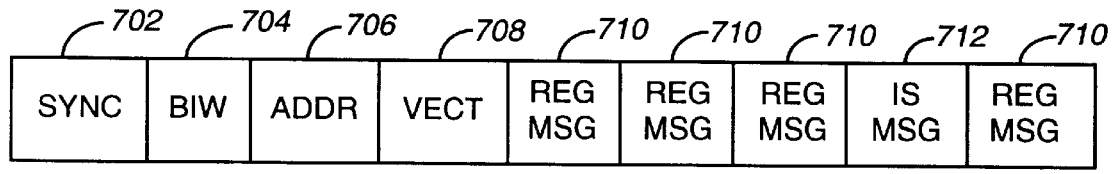
FIG. 7  PRIOR ART
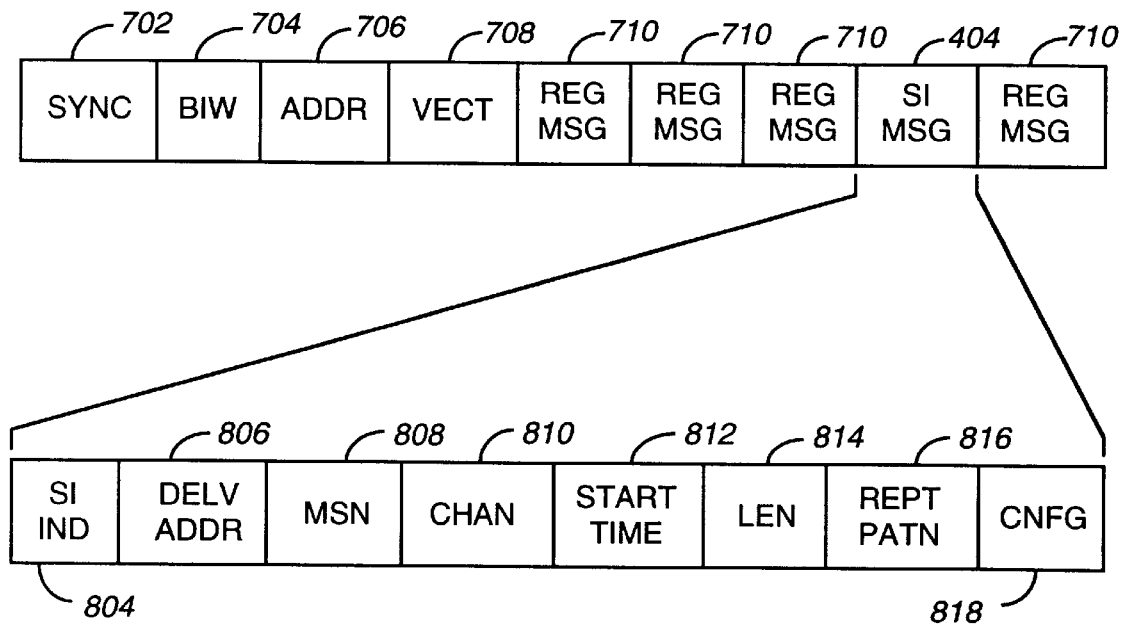
FIG. 8

METHOD AND APPARATUS FOR SCHEDULING A MESSAGE FOR A FIRST MESSAGING SYSTEM AND INFORMING A SUBSCRIBER UNIT ABOUT THE MESSAGE THROUGH A SECOND MESSAGING SYSTEM

FIELD OF THE INVENTION

This invention relates in general to wireless communication systems, and more specifically to a method and apparatus for scheduling a message for a first messaging system and informing a subscriber unit about the message through a second messaging system.

BACKGROUND OF THE INVENTION

Information services (IS) messages, which provide information of a general interest, such as news headlines, sports scores, stock quotations, and the like, are becoming a popular option in modern messaging systems. Because IS messages can be lengthy, a service provider prefers to send each such message to a common IS address for simultaneous receipt by a plurality of subscriber units assigned to the common address, thereby conserving air time.

Conservation of IS air time can become difficult in large cities, where there may be multiple service providers offering messaging service on a plurality of communication channels. This is because each service provider independently schedules the IS messages for subscribers of his system on each of the channels utilized by his system. Each IS message thus is transmitted multiple times on multiple channels in the same city, which wastes valuable air time.

Thus, what is needed is a method and apparatus that can consolidate the delivery of IS messages in areas where multiple messaging systems are operating on multiple channels provided by a plurality of service providers. Preferably, the method and apparatus will operate such that it can be added transparently to existing messaging systems without the necessity of modifying the existing infrastructure or protocols used for message entry and transmission.

SUMMARY OF THE INVENTION

An aspect of the present invention is a method for scheduling and communicating a first store-and-forward message through a first messaging system on a first channel, the first message intended for a subscriber unit operating in a second messaging system on a second channel. The method comprises the steps of scheduling, by the first messaging system, the first message for transmission on the first channel; and entering, by the first messaging system, a second store-and-forward message into the second messaging system, the second message intended for the subscriber unit and containing a scheduling instruction for receiving the first message. The method further comprises the steps of communicating, by the second messaging system, the second message to the subscriber unit on the second channel; and tuning, by the subscriber unit, to the first channel, in accordance with the scheduling instruction, after receiving the second message. The method also includes the steps of transmitting, by the first messaging system, the first message on the first channel as scheduled; and receiving, by the subscriber unit, the first message on the first channel.

Another aspect of the present invention is a subscriber unit for receiving a first store-and-forward message through a first messaging system on a first channel, the subscriber unit operating in a second messaging system on a second channel. The subscriber unit comprises a receiver for receiving a second store-and-forward message from the second messaging system on the second channel, the second message intended for the subscriber unit and containing a scheduling instruction for receiving the first message; and a processing system coupled to the receiver for tuning the receiver to the first channel in accordance with the scheduling instruction to receive the first message on the first channel, after receiving the second message.

Another aspect of the present invention is a controller in a first messaging system for scheduling and communicating a first store-and-forward message on a first channel, the first message intended for a subscriber unit operating in a second messaging system on a second channel. The controller comprises an input interface for receiving the first message, and a processing system coupled to the input interface for scheduling the first message for transmission on the first channel. The controller further comprises a base station interface coupled to the processing system for controlling a base station to transmit the first message on the first channel as scheduled; and a communication interface coupled to the processing system for entering a second store-and-forward message into the second messaging system, the second message intended for the subscriber unit and containing a scheduling instruction for receiving the first message on the first channel.

BRIEF DESCRIPTION OF THE DRAWINGS

FIG. 2 is an electrical block diagram of an exemplary subscriber unit in accordance with the present invention.

FIG. 5 is an exemplary flow diagram depicting operation of the first controller in accordance with the present invention.

FIG. 6 is an exemplary flow diagram depicting operation of the subscriber unit in accordance with the present invention.

FIG. 7 is a protocol diagram depicting a prior art arrangement for transmitting messages.

FIG. 8 is an exemplary protocol diagram depicting a novel arrangement for scheduling a message for delivery in accordance with the present invention.

DETAILED DESCRIPTION OF THE DRAWINGS

Figure 1:
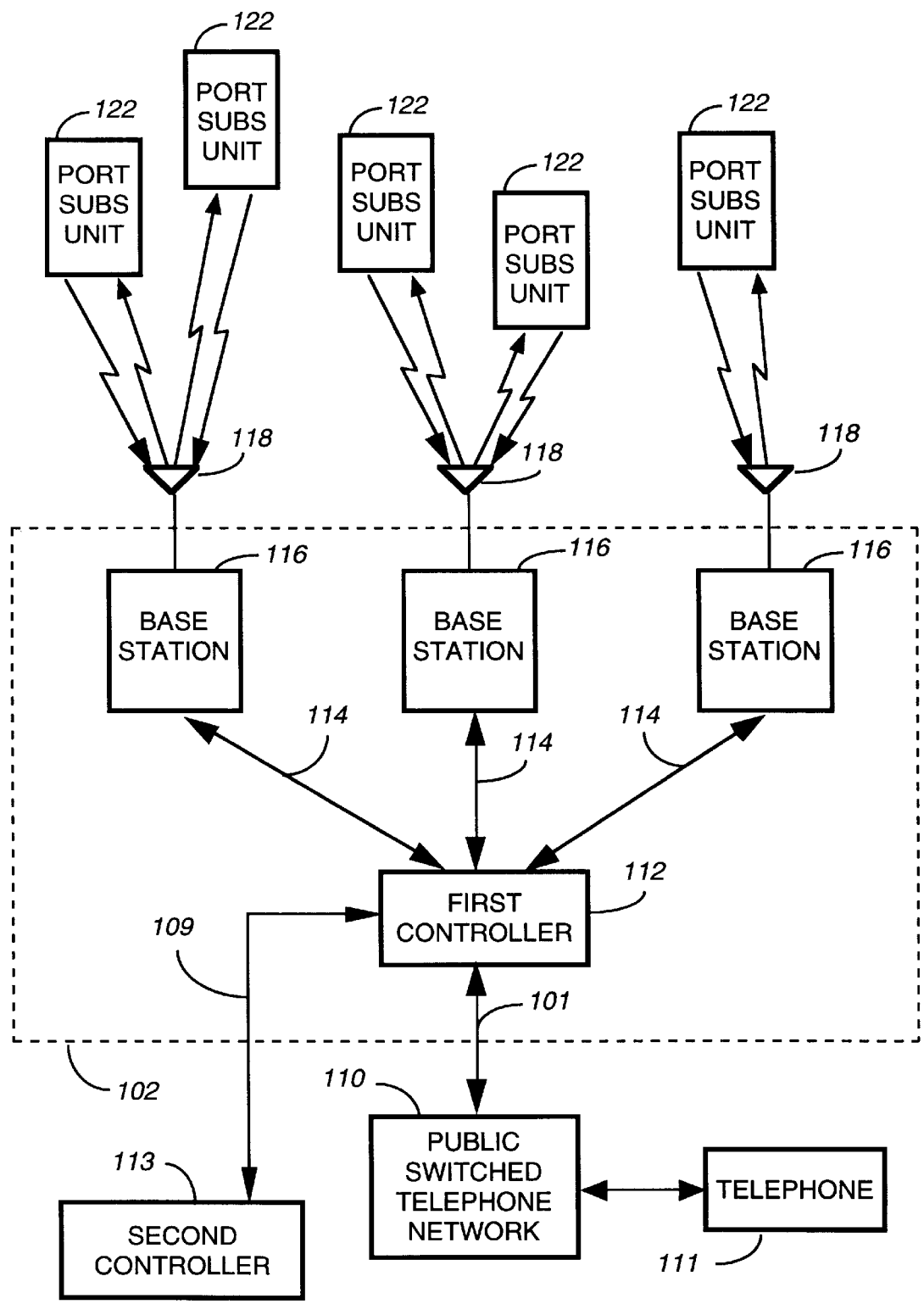
FIG. 1 is an electrical block diagram of an exemplary messaging system in accordance with the present invention.

Referring to FIG. 1, an electrical block diagram of an exemplary messaging system in accordance with the present invention comprises a fixed portion 102 including a first controller 112 and a plurality of base stations 116, and a portable portion including a plurality of portable subscriber units 122, preferably having acknowledge-back capability. The base stations 116 preferably communicate with the portable subscriber units 122 utilizing conventional radio frequency (RF) techniques, and are coupled by communication links 114 to the first controller 112, which controls the base stations 116.

The hardware of the first controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the RF-Orchestra! transmitter and RF-Audience!™ receivers manufactured by Motorola, Inc. The portable subscriber units 122 are preferably similar to Tenor™ voice messaging units and Pagefinder™ data messaging units, also manufactured by Motorola, Inc., and having software modified in accordance with the present invention. It will be appreciated that other similar hardware can be utilized as well for the first controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the first controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests.

The first controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the first controller 112. The first controller 112 also is preferably coupled to a standard message entry port, similar to the communication interface 319 (FIG. 3), of a second controller 113 by a communication link 109 for entering a scheduling instruction message 404 (FIGS. 4, 8) to be transmitted by the second controller through a second messaging system 113, 116 (FIG. 4) in accordance with the present invention. The scheduling instruction message 404 preferably is entered through normal techniques for message entry and is transparent, i.e., appears similar to non-scheduling messages such as normal text messages, to the second messaging system. The protocol utilized between the first and second controllers 112, 113 for message entry is preferably a well known message entry protocol, e.g., the Telocator Network Paging Protocol (TNPP), the Wireless Messaging transfer Protocol (WMtp™), or the InterPaging Networking Protocol (IPNP). This standard message entry port preferably also can be utilized by individual message originators for entering messages using well-known techniques. It will be appreciated that the first and second controllers 112, 113 preferably are similar to one another.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well, and that the present invention can be applied to a one-way messaging system as well as to the two-way messaging system depicted in FIG. 1.

FIG. 2 is an electrical block diagram of an exemplary subscriber unit 122 in accordance with the present invention. The portable subscriber unit 122 comprises an antenna 204 for intercepting an outbound message and for transmitting an inbound message. The antenna 204 is coupled to a conventional receiver 208 for receiving the outbound message and is also preferably coupled to a conventional transmitter 209 for transmitting the inbound message. The receiver 208 and the transmitter 209 are coupled to a processing system 206 for processing the outbound and inbound messages and for controlling the portable subscriber unit 122 in accordance with the present invention. A user interface 214 is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements in accordance with the present invention.

The processing system 206 comprises a conventional processor 210 and a conventional memory 212. The memory 212 comprises software elements and other variables for programming the processing system 206 in accordance with the present invention. The memory 212 includes a selective call address 222 to which the portable subscriber unit 122 is responsive, and a message storage element 224 for storing inbound and outbound messages for processing. The memory 212 further comprises a message interpretation element 226 for controlling the processing system 206 to interpret an outbound message in accordance with the present invention. The memory 212 also includes space for storing at least one scheduling instruction 228 derived from at least one outbound message. In addition, the memory 212 comprises a channel tuning element 230 for programming the processing system 206 to tune the receiver 208 to a first channel used by the first controller 112 for transmitting a first message through the first messaging system, in accordance with a scheduling instruction 228 received in a second message transmitted through the second controller 113 and the second messaging system.

The memory 212 also includes a conflict resolution element 232 for resolving a conflict according to a predetermined conflict resolution, wherein the conflict results from scheduling, by the second messaging system, a third message for transmission to the subscriber unit, the third message scheduled at a time which overlaps with a transmission of the first message. For example, when the first message is an information services (IS) message, and the third message is an individual message addressed to an individual address of the subscriber unit 122, the predetermined conflict resolution preferably requires that the subscriber unit 122 remain tuned to the channel used by the second messaging system, so as not to miss the individual message. It will be appreciated that, alternatively, the predetermined conflict resolution can require the opposite course of action, as well, if that is what is desired by the user of the subscriber unit 122. In addition, the memory 212 includes space for storing configuration information 234 received in the scheduling instruction message 404. The configuration information 234 is used by the processing system 206 to facilitate receiving the first message from the first messaging system. The configuration information can include, for example, a cross reference between pairs of "shorthand" channel descriptions used by the the first messaging system, e.g., channel "3", and corresponding channel frequency, e.g., 921.255 MHz.

Figure 3:
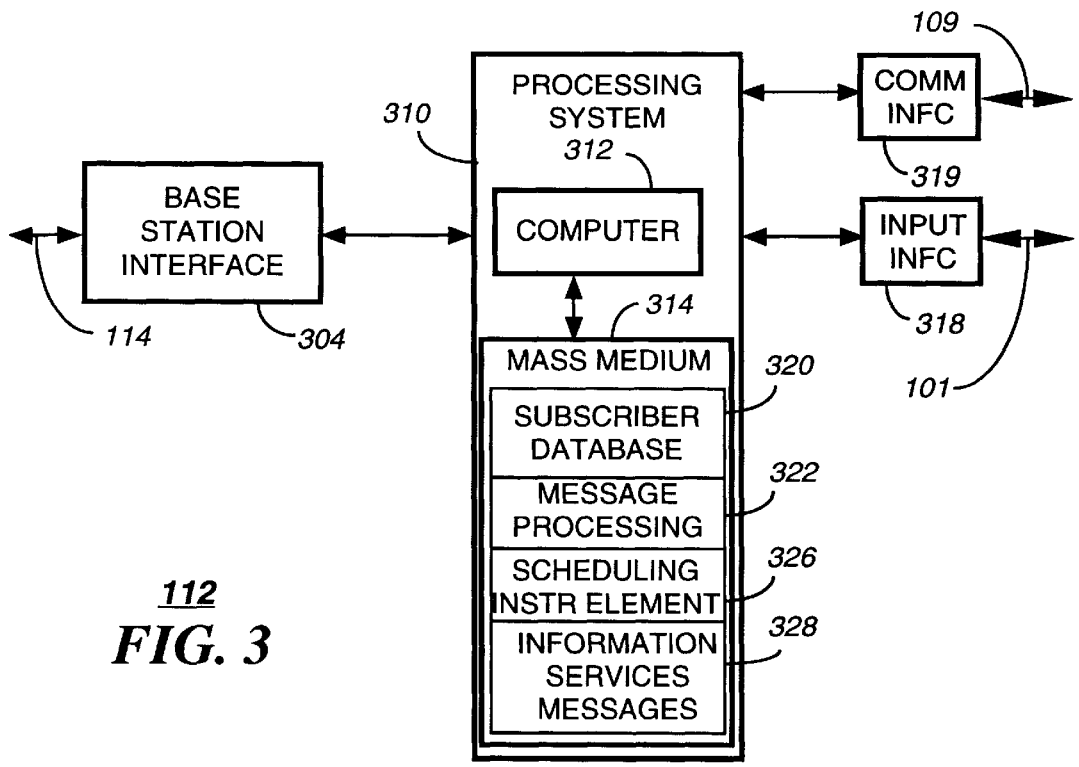
FIG. 3 is an electrical block diagram of an exemplary controller in accordance with the present invention.

FIG. 3 is an electrical block diagram of an exemplary controller 112 in accordance with the present invention. The controller 112 comprises a processing system 310 for executing the operations of the controller 112. The processing system 310 is coupled to a conventional input interface 318 for receiving messages through the telephone links 101. The processing system 310 is also coupled to a conventional base station interface 304 for controlling and communicating with the base stations 116 through the communication link 114. It will be appreciated that more than one base station interface 304 can be present, depending upon system size. In addition, the processing system 310 is coupled to a conventional communication interface 319 for entering a second store-and-forward message into the second controller 113 of the second messaging system, the second message intended for the subscriber unit 122 and containing a scheduling instruction for receiving a first message on a first channel. It will be appreciated that, alternatively, the input interface 318 and the communication interface 319 can be combined into a single interface.

The processing system 310 comprises a conventional computer 312 and a conventional mass storage medium 314. The mass storage medium 314 includes, for example, a subscriber database 320, comprising subscriber information such as addressing and programming options of the portable subscriber units 122. The computer 312 is preferably programmed by way of software included in the mass storage medium 314 for providing the operations and features required in accordance with the present invention. The computer 312 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The mass storage medium 314 is preferably a conventional hard disk mass storage device. It will be appreciated that other types of conventional computers 312 can be utilized, and that additional computers 312 and mass storage media 314 of the same or alternative type can be added as required to handle the processing requirements of the processing system 310.

The mass storage medium 314 preferably includes software and various databases utilized in accordance with the present invention. The mass storage medium 314 preferably includes a message processing element 322 for processing messages through well-known techniques. The mass medium 314 also includes a scheduling instruction element 326 for composing and communicating scheduling instruction messages 404 in accordance with the present invention. In addition, the mass medium 314 includes space for stored information services messages 328 awaiting transmission.

Figure 4:
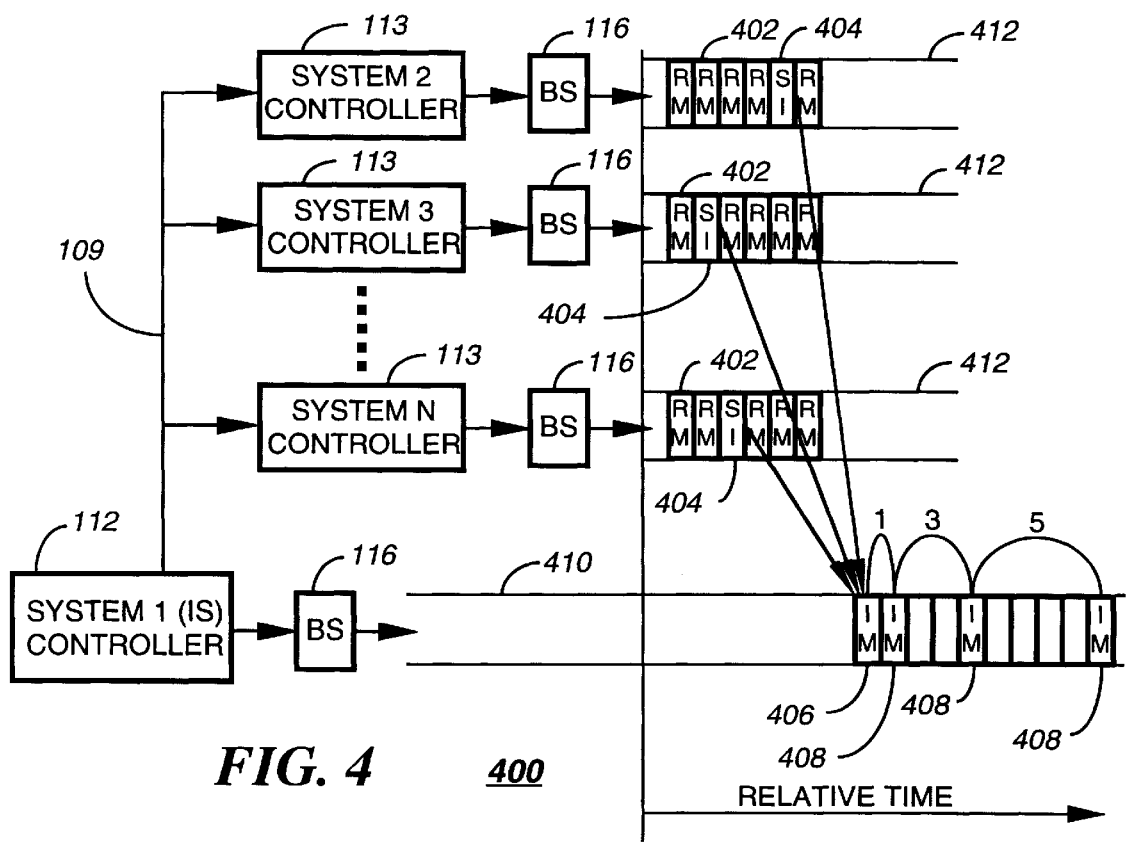
FIG. 4 is an exemplary multi-system diagram depicting message scheduling and completion in accordance with the present invention.

FIG. 4 is an exemplary multi-system diagram 400 depicting message scheduling and completion in accordance with the present invention. The diagram 400 comprises a first controller 112, which is, for example, dedicated to scheduling and sending information services (IS) messages through at least one base station 116 on a first channel 410. The first controller 112 is coupled by the communication link 109 to at least one second controller 113 operating in at least one second messaging system for scheduling and sending preferably non-IS messages on at least one second channel 412. The non-IS messages comprise regular messages 402, e.g., alphanumeric messages and voice messages, and scheduling instruction messages 404 entered into the at least one second messaging system by the first controller 112. The scheduling instruction messages 404 include information which steers, or vectors, the subscriber units 122 to which the scheduling instruction messages 404 are addressed, to specific time slots on the first channel 410, as described further below. During the specific time slots, the first controller 112 transmits an IS message 406 and subsequent repeats 408 of the IS message on the first channel 410. It will be appreciated that the first controller 112 preferably schedules the IS message 406 with a sufficient delay such that there is time for the second controller(s) 113 to schedule and transmit all the scheduling instruction messages 404 before the IS message 406 is transmitted. This is preferably accomplished through empirical observation of the latency of the second messaging system(s), adjusted for time of day, and with a predetermined additional time delay added to absorb statistical variations in latency.

The subsequent repeats 408 preferably are scheduled by the first controller 112 to be repeated at a first interval that is orthogonal to a second interval utilized by the second messaging system for sending the messages 402, 404. For example, if the second messaging system is a FLEX™ system, which transmits to any given subscriber unit 122 at a second interval of $2^n$ frames, where n is the "collapse" value assigned to the subscriber unit 122, then the first interval should not be a power of 2. Repeating at intervals of 1, 3, and 5 frames as depicted in the diagram 400 can be done, for example. This advantageously will handle conflicts due to messages being scheduled simultaneously for the same subscriber unit 122 on both the first and second messaging systems, because a subscriber unit 122 that cannot receive the first transmission of the IS message 406 due to having to simultaneously monitor the second messaging system for its own individual messages, can subsequently monitor the first messaging system to receive one of the subsequent repeats 408.

FIG. 5 is an exemplary flow diagram 500 depicting operation of the first controller 112 in accordance with the present invention. The diagram 500 begins with the first messaging system controller 112 scheduling 502 a first store-and-forward message for transmission on the first channel 410, the first message intended for a subscriber unit 122 that operates in a second messaging system on the second channel 412. The first controller 112 then enters 504 a second store-and-forward message into the second messaging system, preferably using a standard message entry port, e.g., the communication interface 319 or the input interface 318, of the second controller 113 of the second messaging system and a standard message entry protocol, as also used by individual message originators. The second message is addressed to the subscriber unit 122 and comprises a scheduling instruction message 404, transparent to the second messaging system, for instructing the subscriber unit 122 to receive the first message on the first channel 410. The second message preferably includes information placed therein by the first controller 112 defining a repeat interval structure utilized by the first controller 112 for repeating the first message. In addition, the first controller 112 optionally can place configuration information, e.g., a channel number-to-radio frequency cross-reference table, for the first messaging system into the second message. The second controller 113 then communicates the second message through the second messaging system to the subscriber unit 122 over the second channel 412. The first controller 112 then transmits 506 the first message on the first channel 410, as scheduled, repeating the first message at a first interval that is orthogonal to a second interval utilized by the second controller 113 of the second messaging system for sending messages to the subscriber unit 122.

FIG. 6 is an exemplary flow diagram 600 depicting operation of the subscriber unit 122 in accordance with the present invention. The diagram 600 begins with the subscriber unit 122 receiving 602 a message addressed to a first address, preferably a group call IS address, the message received on a "personal" channel, i.e., one of the second channels 412, assigned to the subscriber unit 122. It will be appreciated that, alternatively, the first address can be an individual address assigned uniquely to the subscriber unit 122. The subscriber unit 122 then interprets 604 the user data portion of message to determine whether it comprises a scheduling instruction (SI) 404 for, for example, an information services (IS) message on a "shared" channel, i.e., the first channel 410. If not, at step 606 the processing system 206 decides to process 608 the user data normally, e.g., to display the user data on the display 216. If, on the other hand, at step 606 the user data is a scheduling instruction 404, then the processing system 206 of the subscriber unit 122 stores 610 the information from the scheduling instruction in the memory 212 for use in receiving the IS message. The processing system 206 then monitors the time to determine 612 whether it is time to receive the next IS message. If not, the processing system 206 controls the receiver 208 to remain 618 on the personal channel, i.e., the second channel 412, for receiving any individual messages that are transmitted.

When, in step 612, it is time for the next IS message 406, the processing system 206 checks 614 whether there is any conflict with the personal channel, i.e., whether messages are scheduled for simultaneous transmission to the subscriber unit 122 on both the personal channel 412 and the IS channel 410. If so, the processing system 206 preferably controls the receiver 208 to remain 616 on the personal channel to receive the personal message 402. Flow then returns to step 612 to await a next IS message, i.e., a next subsequent repeat 408 of the IS message. When the time comes, flow then again moves to step 614 to check whether there is a conflict. If not, the processing system 206 controls the receiver 208 to tune 620 to the IS channel 410 in accordance with the scheduling instruction 404. The processing system 206 then checks 622 whether the IS message 406, 408 was received. If so, the processing system 206 returns 624 the subscriber unit to the personal channel 412 and the process ends. If not, the processing system 206 still returns 626 to the personal channel, but continues to check 612 whether it is time for a next repeat 408 of the IS message.

FIG. 7 is a protocol diagram 700 depicting a prior art arrangement for transmitting IS messages. The diagram 700 comprises a synchronization signal 702 for synchronizing a receiver using well known techniques. The diagram 700 further comprises a block information word 704 for providing general system information. In addition, the diagram 700 includes addresses 706 of subscriber units for which messages are intended, and vectors 708 describing where and when the messages can be received. The messages, comprising regular messages 710 and at least one information services (IS) message 712 then follow. This prior art arrangement unfortunately has no provision for allowing a separate IS messaging system to schedule an IS message on a separate IS channel and then transparently steer a subscriber unit operating on a second messaging system to the IS messaging system at the proper time to receive the IS message.

FIG. 8 is an exemplary protocol diagram 800 depicting a novel arrangement for scheduling a message for delivery in accordance with the present invention. The diagram 800 is similar to the diagram 700, the essential difference being the substitution of the scheduling instruction message 404 for the information services message 712. The novel scheduling instruction message 404 advantageously allows a subscriber unit 122 that is normally assigned to one messaging system for receiving personal messages to be temporarily steered to another messaging system for receiving another kind of message, e.g., an IS message. The scheduling instruction message 404 comprises a scheduling instruction indicator 804 for indicating to the subscriber unit 122 that the message 404 is a scheduling instruction (SI) message. The SI message preferably includes sufficient additional information to instruct the subscriber unit 122 where and when to receive an associated information services (IS) message scheduled for future transmission on the other messaging system. The additional information preferably includes a delivery address 806 for the IS message, a message sequence number 808, and a channel (or, alternatively, a frequency) 810 for receiving the IS message. The additional information also preferably includes the start time 812 for the scheduled IS message, and the length 814 of the IS message. The additional information preferably further comprises the repeat pattern 816 to be used for repeating the IS message, and configuration information 818 describing the configuration of the messaging system that will transmit the IS message. It will be appreciated that, alternatively, the additional information can include more or less than all of the information listed above.

Thus, it should be clear from the preceding disclosure that the present invention provides a method and apparatus in a communication receiver for consolidating the delivery of IS messages in areas where multiple messaging systems are operating on multiple channels provided by a plurality of service providers. The method and apparatus advantageously operates such that it can be added transparently to existing messaging systems without the necessity of modifying the existing infrastructure or protocols used for message entry and transmission.

Many modifications and variations of the present invention are possible in light of the above teachings. For example, while the exemplary embodiments in accordance with the present invention have applied techniques of the present invention to facilitate the scheduling and communication of information services (IS) messages, the same techniques can be applied to other types of messages which may benefit from transmission on a messaging system different from the messaging system normally accessed by the subscriber unit. In addition, while the exemplary embodiments have implied a first messaging system and a plurality of second messaging systems, the present invention can be applied to a first messaging system and a single second messaging system. Many other variations will occur to one of ordinary skill in the art, given the teachings of the preceding disclosure. Thus, it is to be understood that, within the scope of the appended claims, the invention can be practiced other than as described herein above.

What is claimed is:

1. A method for scheduling and communicating a first store-and-forward message through a first messaging system on a first channel, the first message intended for a subscriber unit operating in a second messaging system on a second channel, the method comprising the steps of:

scheduling, by the first messaging system, the first message for transmission on the first channel;

entering, by the first messaging system, a second store-and-forward message into the second messaging system, the second message intended for the subscriber unit and containing a scheduling instruction for receiving the first message, the second message entered through a standard message entry port of the second messaging system as utilized by individual message originators, wherein the scheduling instruction contained in the second message is transparent to the second messaging system;

communicating, by the second messaging system, the second message to the subscriber unit on the second channel;

tuning, by the subscriber unit, to the first channel, in accordance with the scheduling instruction, after receiving the second message;

transmitting, by the first messaging system, the first message on the first channel as scheduled; and receiving, by the subscriber unit, the first message on the first channel.

2. The method of claim 1, further comprising the step of returning, by the subscriber unit, to the second channel in response to completing reception of the first message.

3. The method of claim 1, further comprising in the subscriber unit the step of resolving a conflict according to a predetermined conflict resolution, wherein the conflict results from scheduling, by the second messaging system, a third message for transmission to the subscriber unit, the third message scheduled at a time which overlaps with a transmission of the first message.

4. The method of claim 1, wherein the scheduling step comprises the step of scheduling the first message to be repeated at a first interval that is orthogonal to a second interval utilized by the second messaging system for sending messages to the subscriber unit.

5. The method of claim 1, wherein the entering step further comprises the step of placing configuration information for the first messaging system into the second message, and wherein the method further comprises in the subscriber unit the steps of:
storing the configuration information in a memory; and
utilizing the configuration information for receiving the first message.

6. The method of claim 1, wherein the entering step comprises the step of placing, into the second message, information defining a repeat interval structure utilized for repeating the first message.

7. The method of claim 1, further comprising in the subscriber unit the step of interpreting a portion of the second message to derive the scheduling instruction.

8. The method of claim 1, wherein the tuning step comprises the step of tuning to the first channel during at least one of a plurality of time periods during which the first message is repeated.

9. A subscriber unit for receiving a first store-and-forward message through a first messaging system on a first channel, the subscriber unit operating in a second messaging system on a second channel, the subscriber unit comprising:

a receiver for receiving a second store-and-forward message from the second messaging system on the second channel, the second message intended for the subscriber unit and containing a scheduling instruction for receiving the first message, the second message entered through a standard message entry port of the second messaging system as utilized by individual message originators, wherein the scheduling instruction contained in the second message is transparent to the second messaging system;

a processing system coupled to the receiver for tuning the receiver to the first channel in accordance with the scheduling instruction to receive the first message on the first channel, after receiving the second message.

10. The subscriber unit of claim 9, wherein the processing system is programmed to return the receiver to the second channel, in response to completing reception of the first message.

11. The subscriber unit of claim 9, wherein the processing system is programmed to resolve a conflict according to a predetermined conflict resolution, wherein the conflict results from scheduling, by the second messaging system, a third message for transmission to the subscriber unit, the third message scheduled at a time which overlaps with a transmission of the first message.

12. The subscriber unit of claim 9, wherein the processing system and the receiver are arranged to cooperate to receive configuration information for the first messaging system in the second message, and wherein the processing system comprises a memory, and wherein the processing system is programmed to:
store the configuration information in the memory; and
utilize the configuration information for receiving the first message.

13. The subscriber unit of claim 9, wherein the processing system is programmed to interpret a portion of the second message to derive the scheduling instruction.

14. The subscriber unit of claim 9, wherein the processing system is programmed to tune the receiver to the first channel during at least one of a plurality of time periods during which the first message is repeated.

15. A controller in a first messaging system for scheduling and communicating a first store-and-forward message on a first channel, the first message intended for a subscriber unit operating in a second messaging system on a second channel, the controller comprising:

an input interface for receiving the first message;

a processing system coupled to the input interface for scheduling the first message for transmission on the first channel;

a base station interface coupled to the processing system for controlling a base station to transmit the first message on the first channel as scheduled; and a communication interface coupled to the processing system and coupled to a standard message entry port of the second messaging system as utilized by individual message originators, for entering a second store-and-forward message into the second messaging system, the second message intended for the subscriber unit and containing a scheduling instruction for receiving the first message on the first channel, wherein the scheduling instruction contained in the second message is transparent to the second messaging system.

16. The controller of claim 15, wherein the processing system is programmed to schedule the first message to be repeated at a first interval that is orthogonal to a second interval utilized by the second messaging system for sending messages to the subscriber unit.

17. The controller of claim 15, wherein the processing system is programmed to place configuration information for the first messaging system into the second message.

18. The controller of claim 15, wherein the processing system is programmed to place, into the second message, information defining a repeat interval structure utilized for repeating the first message.

* * * * *